(12) United States Patent
Dong et al.

(10) Patent No.: US 9,921,862 B2
(45) Date of Patent: Mar. 20, 2018

(54) VIRTUAL MACHINE POWER MANAGEMENT

(71) Applicant: Intel Corporation, Santa Clara, CA (US)

(72) Inventors: Yao Zu Dong, Shanghai (CN); Xiantao Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/776,627

(22) PCT Filed: Jun. 24, 2014

(86) PCT No.: PCT/CN2014/080571
§ 371 (c)(1),
(2) Date: Sep. 14, 2015

(87) PCT Pub. No.: WO2015/196343
PCT Pub. Date: Dec. 30, 2015

(65) Prior Publication Data
US 2016/0203012 A1 Jul. 14, 2016

(51) Int. Cl.
*G06F 9/455* (2018.01)
*G06F 1/32* (2006.01)
*G06F 9/48* (2006.01)

(52) U.S. Cl.
CPC ........ *G06F 9/45533* (2013.01); *G06F 1/3206* (2013.01); *G06F 9/455* (2013.01);
(Continued)

(58) Field of Classification Search
CPC .................................................. G06F 9/45533
(Continued)

(56) References Cited

U.S. PATENT DOCUMENTS 8,954,774 B2* 2/2015 Murakami .............. G06F 1/324
713/300
9,405,347 B2* 8/2016 Wang .................... G06F 1/3228
(Continued)

FOREIGN PATENT DOCUMENTS

JP 2012164032 A 8/2012
JP 2013012072 A 1/2013
(Continued)

OTHER PUBLICATIONS

International Search Report and Written Opinion dated Mar. 23, 2015 for International Application No. PCT/CN2014/080571, 18 pages.
(Continued)

*Primary Examiner* — Andy Ho
(74) *Attorney, Agent, or Firm* — Scwhabe, Williamson & Wyatt, P.C.

(57) ABSTRACT

Embodiments described herein relate generally to managing the power consumption of a virtual machine on a computing device. The computing device may include a virtual machine power management feature that is to detect when a virtual machine running on the computing device should be frozen. In response to this detection, the virtual machine may be frozen by reducing the processor cycles consumed by the virtual machine. This detection may be based on, for example, detection that the virtual machine is no longer running in the foreground or detection that the virtual machine is idle. The computing device may be a portable electronic device in which power consumption is an important consideration. Other embodiments may be described and/or claimed.

13 Claims, 7 Drawing Sheets

(52) U.S. Cl.
CPC .......... *G06F 9/45558* (2013.01); *G06F 9/48* (2013.01); *G06F 1/32* (2013.01); *G06F 2009/45575* (2013.01); *G06F 2009/45591* (2013.01); *Y02B 60/146* (2013.01)

(58) Field of Classification Search
USPC .......................................................... 718/1
See application file for complete search history.

(56) References Cited

U.S. PATENT DOCUMENTS

| | | |
|---|---|---|
| 2006/0085794 A1 | 4/2006 | Yokoyama |
| 2011/0154321 A1 | 6/2011 | Tian et al. |
| 2014/0149752 A1 | 5/2014 | Brock et al. |

FOREIGN PATENT DOCUMENTS

| | | |
|---|---|---|
| KR | 20060052086 A | 5/2006 |
| WO | WO2008149412 A1 | 12/2008 |

OTHER PUBLICATIONS

Office Action dated Jul. 25, 2017 for Korean Patent Application No. 10-2016-7032440; 11 pages.

\* cited by examiner

VIRTUAL MACHINE POWER MANAGEMENT

CROSS REFERENCE TO RELATED APPLICATIONS

The present application is a national phase entry under 35 U.S.C. § 371 of International Application No. PCT/CN2014/080571, filed Jun. 24, 2014, entitled "VIRTUAL MACHINE POWER MANAGEMENT", which designated, among the various States, the United States of America. The Specification of the PCT/CN2014/080571 Application is hereby fully incorporated by reference.

FIELD OF INVENTION

Embodiments of the present invention relate generally to the technical field of data processing, and more particularly, to computer devices operable to execute virtual machines with smart virtual machine power management.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

A computing device may be adapted to execute a virtual machine that emulates a real computing device. The emulation by the virtual machine would operate based on the architecture, model, and the like of a real computing device and would therefore allow the execution of applications within the virtual machine similar to a real computing device. Accordingly, the virtual machine may facilitate the execution of a guest operating system that provides a platform for applications.

A guest operating system still consumes computing resources to perform functions, even when the applications are not active on a virtual machine. For example, the guest operating system may require processor cycles to execute instructions. The execution of instructions may follow a traditional policy, such as first in, first out or round robin. In real-world scenarios where power consumption is a concern, such policies may not be acceptable for a user of the computing device executing the virtual machine.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

Figure 1:
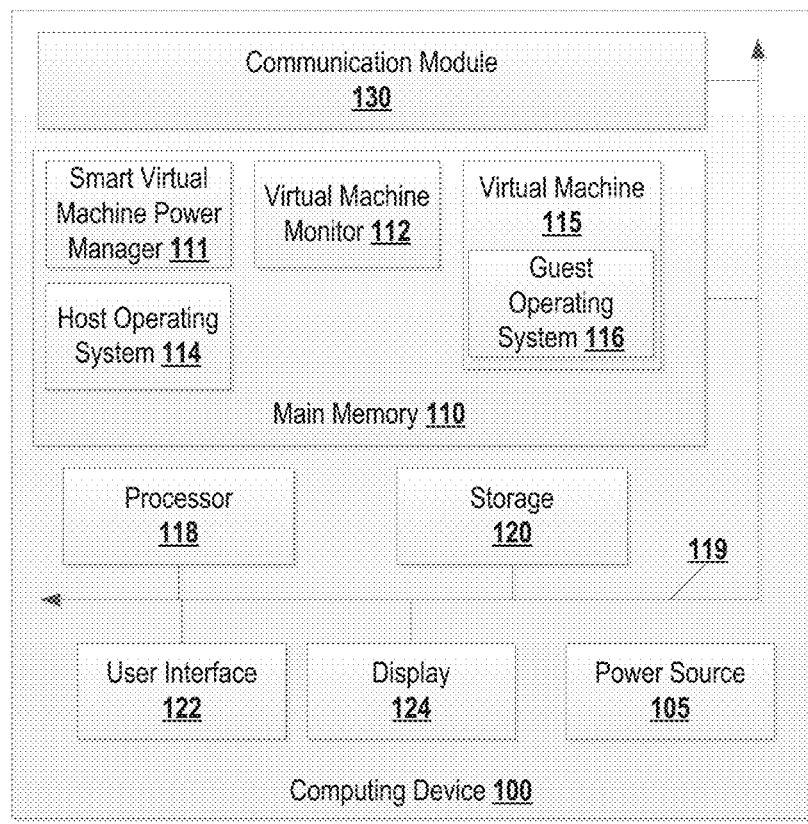
FIG. 1 is a block diagram illustrating a computing device that includes a virtual machine power management feature to manage power consumption of the virtual machines operating on the computing device, in accordance with various embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

As described herein, a computing device may be configured to execute a virtual machine. In various embodiments, the computing device may be of a kind that includes appreciably limited resources (e.g., screen real estate, battery power, and the like), such as a portable electronic device. The computing device may include one or more components to manage the virtual machine, such as a virtual machine monitor or hypervisor. To conserve resources of the computing device, the computing device may include a virtual machine power management feature. The virtual machine power management feature may allow the computing device to "freeze" the virtual machine—that is, cause a reduction in the processor cycles consumed by the virtual machine. Correspondingly, the virtual machine power management feature may allow the computing device to "unfreeze" the virtual machine—that is, cause an increase in the processor cycles consumed by the virtual machine.

In various embodiments, the virtual machine power management feature may be contingent upon one or more events that affect a state of the virtual machine. In one embodiment, the computing device may freeze the virtual machine when the virtual machine is no longer in a foreground state. For example, the computing device may detect an event, such as an input from a user or event from a host operating system of the computing device, that causes the virtual machine to transition from the foreground state to a background state at the computing device. When the virtual machine is no longer in the foreground state, the virtual machine power management feature may allow the computing device to freeze the virtual machine. Should another event cause the virtual machine to transition from the background state to the foreground state, the virtual machine power management feature may allow the computing device to unfreeze the virtual machine.

According to some embodiments, the computing device may freeze the virtual machine when the virtual machine is in an idle state. For example, the computing device may determine that the virtual machine is in the idle state due to the absence of one or more events, such as an absence of detected user interaction with the virtual machine, absence of reception of data packets for the virtual machine, or absence of reception of voice calls for the virtual machine. In response to at least one event associated with the virtual machine, the computing device may unfreeze the virtual machine so that the virtual machine may execute one or more processes to handle the event. For example, a network packet or user interaction directed to the virtual machine may be detected by the computing device and, correspondingly, the computing device may unfreeze the virtual machine so that the virtual machine may process the network packet, respond to the user interaction, or the like.

Beginning first with FIG. 1, a block diagram shows a computing device 100 that includes a virtual machine power management feature to manage power consumption by virtual machines operating on the computing device, in accordance with various embodiments. In various embodiments, the computing device 100, except for the virtual machine power management feature of the present disclosure, may be any type of portable computing device adapted to operate and manage a virtual machine, such as a netbook, a tablet computer, a handheld computing device, a portable web-enabled appliance, a gaming device, a mobile phone, a smartphone, an eBook reader, a personal data assistant, or the like.

The computing device 100 may include, but is not limited to, a power source 105, main memory 110, storage 120, a processor 118, a user interface 122, a display 124, and a communication module 130. In particular, the memory 110 may include a smart virtual machine power manager 111 configured to manage power consumption by the virtual machines 115, thereby in turn reduce the power consumption of computing device 100, to be described more fully below. These components may be communicatively coupled through a bus 119. The bus 119 may be any subsystem adapted to transfer data within the computing device 100. The bus 119 may include a plurality of computer buses as well as additional circuitry adapted to transfer data within the computing device 100.

To communicate data with another computing device (not shown), the computing device 100 may include a communication module 130. The communication module 130 may accept data across a network (not shown) from an external computing device to be processed by the computing device 100. The communication module may be configured to communicate over a plurality of networks, such as a public or private network, a combination of different types of networks, a local area network ("LAN"), a wide area network ("WAN") such as the Internet, a personal area network ("PAN"), a peer-to-peer network, a wireless cellular network (e.g., a cellular data network), a public switched telephone network ("PSTN"), or a combination thereof. Thus, the communication module 130 may be configured to communicate data (e.g., network packets) and/or voice calls (e.g., analog voice data). The communication module 130 may be implemented in hardware, software, or a combination of the two and may include, for example, components such as a network card, network access controller, and/or other network interface controller(s). The communication module 130 is communicatively coupled with the processor 118, which executes instructions for the computing device 100. In one embodiment, the processor 118 executes some or all of the instructions for the communication module 130.

As an additional means of receiving data, the computing device 100 may include a user interface 122 to receive input from a user. The user interface 122 may allow a user to interact with the computing device 100 through various means, according to different embodiments—e.g., the user interface 122 may be presented to a user on a display 124 as a graphical user interface or through a command line interface. To receive user input, the user interface 122 may be implemented in hardware, software, or a combination of the two and may include or may be communicatively coupled with one or more hardware devices suitable for user input (e.g., a keyboard, mouse, touch screen, or gesture recognition). Further, the processor 118 may execute some or all of the instructions for the user interface 122.

The processor 118 may be any processor suitable to execute instructions, such as instructions from the main memory 110. Accordingly, the processor 118 may be, for example, a central processing unit ("CPU"), a microprocessor, or another similar processor. In some embodiments, the processor 118 includes a plurality of processors, such as a dedicated processor (e.g., a graphics processing unit), a network processor, or any processor suitable to execute operations of the computing device 100. In various embodiments, the processor 118 may include a plurality of processors. In one embodiment, the processor 118 may be a multi-core processor with a plurality of CPUs (e.g., cores).

Coupled with the processor 118 is the main memory 110. The main memory 110 may offer both short-term and long-term storage and may in fact be divided into several units (including a unit located at the processor 118). The main memory 110 may be volatile, such as static random access memory ("SRAM") and/or dynamic random access memory ("DRAM"), and may provide storage (at least temporarily) of computer-readable instructions, data structures, software applications, and other data for the computing device 100. Such data may be loaded from the storage 120. The main memory 110 may also include cache memory, such as a cache located at the processor 118. The main memory 110 may include, but is not limited to, instructions related to the elements 111-116 that are to be executed by the processor 118: the earlier described smart virtual machine power manager 111 to provide a virtual machine power management feature, a virtual machine monitor ("VMM") 112 to manage a virtual machine 115, a host operating system 114, a virtual machine 115, and a guest operating system 116.

In various embodiments, the host operating system 114 may be configured to initiate the execution of the instructions, such as instructions provided by the smart virtual machine power manager 111, the virtual machine monitor 112, the virtual machine 115, and/or the guest operating system 116. In particular, the host operating system 114 may be adapted to serve as a platform for running the smart virtual machine power manager 111, the virtual machine monitor 112, and/or the virtual machine 115. The host operating system 114 may be adapted to perform other operations across the components of the computing device 100, including threading, resource management, data storage control, and other similar functionalities. In various embodiments, the host operating system 114 and/or VMM 112 may include and/or be communicatively coupled with an operating system power management ("OSPM"), which may include circuitry to manage various power states associated with the computing device 100.

The VMM 112, which may also be implemented as a hypervisor, may be operable to create, manage, run, and/or terminate a virtual machine. In various embodiments, the VMM 112 may be of Type 1, also known as native, unhosted, and/or bare metal. In such embodiments, the VMM 112 may run directly on the hardware (e.g., the main memory 110 and the processor 118) of the computing device 100. Accordingly, the VMM 112 may be operable to control such hardware while managing the virtual machine 115 and/or the guest operating system 116. In one embodiment, the host operating system 114 may be a service operating system, driver domain, or privileged virtual machine—e.g., where the host operating system 114 runs on the VMM 112. According to another embodiment, operations and functionality of the host operating system 114 may be integrated with the VMM 112, as may be found in Type 1 hypervisors that run directly on hardware of the computing device 100. In other embodiments, the VMM 112 may be of Type 2, also known as hosted. In Type 2 embodiments, the VMM 112 may be executed by the host operating system 114 (e.g., the VMM 112 may be included in or communicatively coupled with the host operating system 114). As illustrated in FIG. 1, the VMM 112 may be instructions within the main memory 110 to be executed by the processor 118. However, the VMM 112 may be firmware and/or hardware in other embodiments.

The VMM 112 may manage the virtual machine 115, such as by controlling the scheduling of resources consumed by the guest operating system 116 (e.g., cycles of the processor 118). According to an embodiment, the VMM 112 may include or may be communicatively coupled with one or more components adapted to allocate resources for the virtual machine 115. For example, the VMM 112 may include or be communicatively coupled with a scheduler (not shown) and/or a memory manager (not shown). A scheduler may allocate time slots for one or more processes (e.g., threads) based on, for example, a scheduling policy and/or resource availability. Similarly, a memory manager processes requests for memory (e.g., main memory 110) and allocates memory based on, for example, a memory allocation policy and/or resource availability.

The virtual machine 115 may be an emulation of a physical computing device (e.g., an emulation of a computing device similar to the computing device 100). Therefore, the virtual machine 115 may have architecture and functionality similar to that of a physical computing device. The virtual machine 115 may extend to use virtualization software components, as may be found in paravirtualization for various purposes such as performance, security, power and/or simplicity. To that end, a guest operating system 116 may run on the virtual machine 115. The guest operating system 116 may be similar to and/or perform similar functions as the host operating system 114. However, the guest operating system 116 may be of a different type than the host operating system 114. For example, the guest operating system 116 may manage resources, memory allocation, and the like according to a different scheme than the host operating system 114. In various embodiments, the guest operating system 116 may be adapted to request one or more virtual power states, such as a C state (i.e., processor operating state), a P state (i.e., processor performance state), D state (i.e., device state), and/or a T state (i.e., processor throttling state). In one embodiment, a power state may be associated with a system-on-a-chip, such as a S0i1 and/or S0i3—the S0i1 state may be used when the display is on but the user does not actively interact with the device so that a relatively little amount of power is consumed (e.g., milliwattrange) and can be entered/left in microseconds, and the S0i3 state may be used when the display 124 is off so that a relatively small amount of power is consumed (e.g., microWatt range) and can be entered/left in milliseconds. The C, P, D, and/or T state of the guest operating system 116 may not be identical to a C, P, D, and/or T state of the physical computing device 100—e.g., the guest operating system 116 may only operate in C0 or C1 states, but the physical computing device 100 may operate in C0 state or a deeper C state such as C1-C9. In an alternative embodiment, the guest operating system 116 may implement a different notion of power state that departs from the implemented by the physical computing device 100. In even another embodiment, the guest operating system 116 may use paravirtualization to cooperatively work with VMM 112 to ask for different power state operations. Because the guest operating system 116 operates on the virtual machine 115, one or more requests for the one or more virtual power states may be for the processor 118 but managed by the VMM 112.

In various embodiments, the computing device 100 may include a plurality of virtual machines. Additional virtual machines may have architecture and functionality similar to the virtual machine 115. Further, an additional guest operating system, similar to the guest operating system 116, may run on an additional virtual machine.

As an operating system, the guest operating system 116 may cause the execution of instructions associated with, for example, an application, user input, network communication, and the like. According to various embodiments, the guest operating system 116 may execute instructions in response to user input received at the user interface 122. Additionally, the guest operating system 116 may execute instructions in response to one or more data packets received over a network and processed at the communication module 130. Particularly in embodiments in which the computing device 100 is a portable communication device (e.g., a smartphone), the guest operating system 116 may be adapted to execute instructions in response to a voice call, such as in response to received analog voice data processed at the communication module 130. In various embodiments, the execution of instructions by the guest operating system 116 may prevent the guest operating system 116 from entering an idle state by, for example, requesting a lower C state (e.g., a C1 state) and/or appearing to the virtual machine monitor 112 as idle.

In various embodiments, a plurality of virtual machines having respective guest operating systems, including the virtual machine 115 having guest operating system 116, may be included in main memory 110. In such embodiments, the VMM 112 may be adapted to manage the creation and execution of each virtual machine of the plurality. For example, the VMM 112 may allocate physical resources (e.g., cycles of the processor 118) to each of the plurality of virtual machines according to a scheduling policy.

In embodiments, the computing device 100 may include a smart virtual machine power manager 111. Although illustrated here in the main memory 110, the smart virtual machine power manager 111 may be implemented in hardware, software, firmware, or a combination. According to embodiments, the virtualization operations at the computing device 100 may be expensive for one or more resources of the computing device 100, such as a power source 105 (e.g., a battery or other portable power source). The smart virtual machine power manager 111 may be adapted to attempt to conserve one or more resources of the computing device 100, such as the power source 105. To effect this conservation, the smart virtual machine power manager 111 may influence the execution of instructions associated with the virtual machine 115.

The smart virtual machine power manager 111 may be communicatively coupled with the virtual machine 115 and/or the guest operating system 116. In various embodiments, the smart virtual machine power manager 111 may be adapted to conserve resources of the computing device 100 (e.g., the power source 105) by freezing the virtual machine 115. In embodiments, freezing the virtual machine 115 by the smart virtual machine power manager 111 causes a reduction in cycles of the processor 118 consumed by the virtual machine 115. This reduction in processor 118 cycles consumed by the virtual machine 115 may be, for example, a reduction in processor 118 cycles consumed by the guest operating system 116 through the virtual machine, such as by a suspension or termination of one or more processes to be executed by the guest operating system 116 of the virtual machine 115 and/or by decrease of a frequency of interrupts associated with the virtual machine 115. The reduction in processor 118 cycles consumed by the virtual machine 115 may increase the residency of a low-power C state (e.g., C7 state) and/or facilitate entry of the processor 118 into a deeper C state (e.g., C9), which may reduce power consumption by the processor 118. For example, the reduction in processor 118 cycles consumed by the virtual machine 115 may comprise a reduction in a frequency of interrupts associated with the virtual machine 115, which may facilitate entry of the processor 118 into a low power state (e.g., from C1 to C7).

Correspondingly, the smart virtual machine power manager 111 may be adapted to unfreeze the virtual machine 115. In embodiments, unfreezing the virtual machine 115 by the smart virtual machine power manager 111 causes an increase in cycles of the processor 118 consumed by the virtual machine 115. This increase in processor 118 cycles consumed by the virtual machine 115 may be, for example, an increase in processor 118 cycles consumed by the guest operating system 116 through the virtual machine 115, such as by a restart or resumption of one or more processes to be executed by the guest operating system 116 of the virtual machine 115 (e.g., one or more processes that may have been suspended or terminated based on the reduction in processor 118 cycles) and/or by increase of a frequency of interrupts associated with the virtual machine 115. In embodiments in which the computing device 100 includes a plurality of virtual machines, the smart virtual power manager 111 may be adapted to freeze and/or unfreeze the one or more additional virtual machines and/or guest operating system in a manner similar to that described herein.

According to embodiments, the smart virtual machine power manager 111 may be communicatively coupled with the VMM 112. Because the VMM 112 may be adapted to manage the virtual machine 115, including through the allocation of physical resources, the smart virtual machine power manager 111 may issue a request to the VMM 112 to cause a reduction in processor 118 cycles consumed by the virtual machine 115. In one embodiment, this request may cause the VMM 112 to prevent a scheduler from allocating physical resources to the virtual machine 115. In an embodiment in which the VMM 112 is a hypervisor, the request from the smart virtual machine power manager 111 to the hypervisor 112 may be a hypercall. In many embodiments, a request from the smart virtual machine power manager 111 to cause the reduction in processor 118 cycles consumed by the virtual machine 115 may be to the VMM 112 without commensurate operations by the host operating system 114. In such embodiments, the VMM 112 may be Type 1 (e.g., native, unhosted, and/or bare metal).

In one embodiment, the smart virtual machine power manager 111 may cause a reduction in processor 118 cycles consumed by the virtual machine 115 based on one or more requests to the host operating system 114. The host operating system 114 may include, for example, an application programming interface ("API") that presents an interface and/or includes a protocol adapted to receive one or more requests from the smart virtual machine power manager 111 to cause a reduction in processor 118 cycles consumed by the virtual machine 115. In various embodiments, the host operating system 114 may include or be communicatively coupled with the VMM 112, so that the host operating system 114 may participate in management and execution of the virtual machine 115. In such embodiments, the smart virtual machine power manager 111 may issue a request to the host operating system 114, such as to a scheduler included in or communicatively coupled with the host operating system, and the host operating system 114 may reduce (or terminate) resource allocation (e.g., processor 118 cycles) associated with the virtual machine 115. In many embodiments in which the smart virtual machine power manager 111 is adapted to cause the reduction in processor 118 cycles consumed by the virtual machine 115 via a request to the host operating system 114, the VMM 112 may be Type 2 (e.g., hosted).

In various embodiments, the VMM 112 may be adapted to transition the virtual machine 115 from a foreground state to a background state at the computing device 100—for example, host operating system 114 and/or an application executed thereby may transition from the background state to the foreground state. According to an embodiment, the VMM 112 may detect an input through the user interface 122 that causes the VMM 112 to transition from the foreground state to the background state—e.g., the VMM 112 may detect depression of a tactile button or recognition of a gesture through the user interface 122 associated with transitioning the virtual machine 115 from the foreground state to the background state. In response, the smart virtual machine power manager 111 may be adapted to cause the reduction in processor 118 cycles consumed by the virtual machine 115 based on detection that the virtual machine 115 is no longer in the foreground state of the computing device 100—e.g., that the virtual machine 115 is in the background state or is transitioning from the foreground state to the background state.

In various embodiments, the smart virtual machine power manager 111 may be adapted to determine that the virtual machine 115 is in an idle state. According to an embodiment, the smart virtual machine power manger 111 may detect an absence of an event for the virtual machine 115. For example, the smart virtual machine power manager 111 may determine that the virtual machine 115 is in an idle state based on the absence of a user input detected by the VMM 112 for the virtual machine 115, such as the absence of depression of a tactile button and/or absence of recognition of a gesture to be detected through the user interface 122. In another example, the smart virtual machine power manager 111 may determine that the virtual machine 115 is in the idle state based on the absence of a communication event detected by the VMM 112 for the virtual machine 115, such as the absence of reception of a data packet and/or analog voice data through the communication module 130. In another embodiment, the smart virtual machine power manager 111 may determine that the virtual machine 115 requests a more inactive power state (e.g., the guest operating system 116 may request a deeper C state) and/or the virtual machine 115 is in a more inactive power state for a predetermined amount or percentage of time (e.g., a residency ratio of at least ninety-five (95) percent for C1, or more inactive, power state). In a third embodiment, the smart virtual machine power manager 111 may determine that the virtual machine 115 is in the idle state when the virtual machine 115 is no longer in the foreground state.

Correspondingly, the smart virtual machine power manager 111 may cause an increase in processor 118 cycles. In one embodiment, the smart virtual machine power manager 111 may cause the increase in processor 118 cycles based on detection that the virtual machine 115 is no longer in the background state. In another embodiment, the smart virtual machine power manager 111 may cause the increase in processor 118 cycles based on detection that the virtual machine 115 is no longer idle—for example, the VMM 112 may receive user input, a communication event, and/or a request for a more active power state (e.g., a request for a C0 state).

With the reduction in processor 118 cycles due to the virtual machine 115 (and/or other virtual machines), an OSPM (not shown) associated with the host operating system 114 may transition one or more operations. For example, the OSPM may transition the computing device 100 to a deeper power state, such as a C9 state for the processor 118 if the one or more virtual machines (including the virtual machine 115) are determined to be idle. Where the one or more virtual machines (including the virtual machine 115) are frozen, the input/output ("I/O") resources consumed by the one or more virtual machines (including the virtual machine 115) (e.g., camera device, block device, etc.) may be reduced and also transitioned into a lower power state (e.g., D3) by the OSPM.

Figure 2:
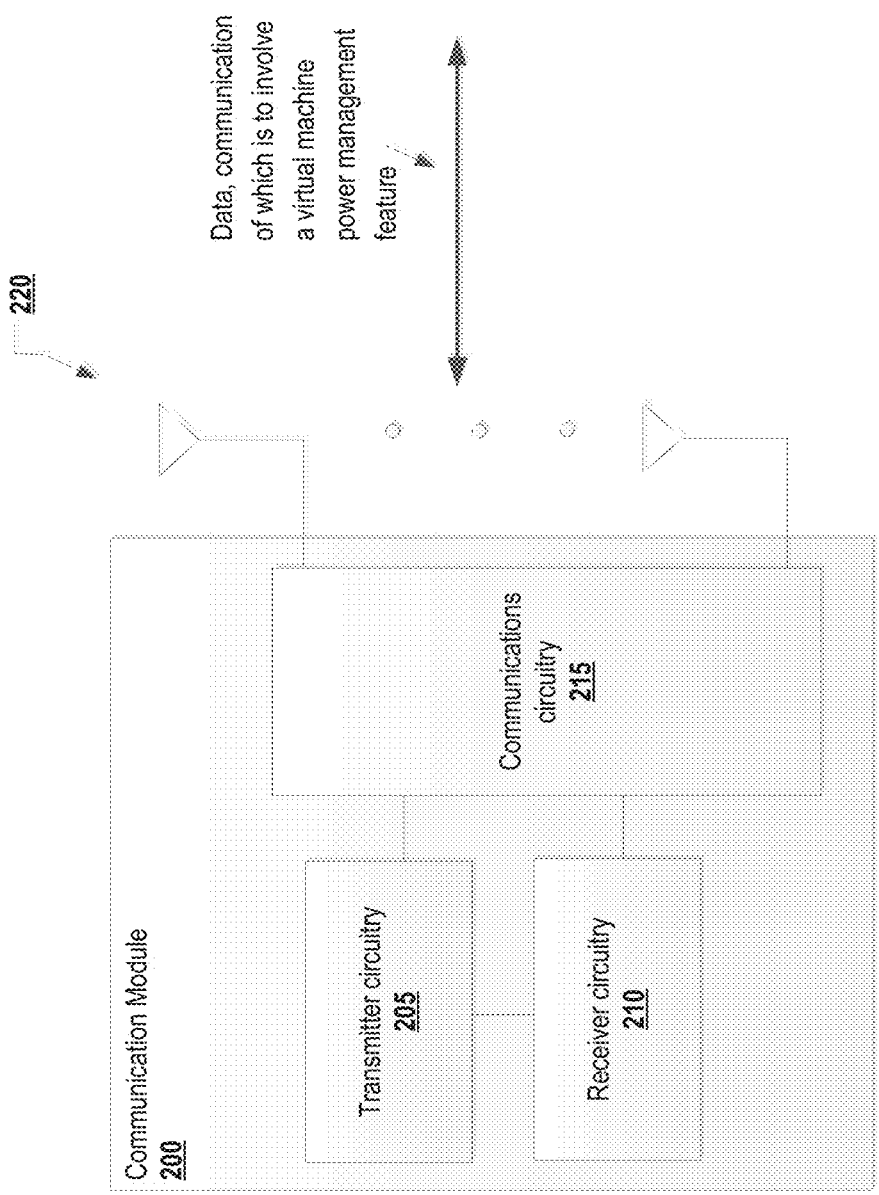
FIG. 2 is a block diagram illustrating a communication module to wirelessly receive and transmit data that may prevent a virtual machine from transitioning to an idle state, in accordance with various embodiments.

With respect to FIG. 2, a block diagram illustrates a communication module 200 for wireless reception and transmission of files between computing devices that may prevent a virtual machine from transitioning to an idle state, in accordance with various embodiments. The communication module 200 may be or may be included in the communication module 130 of FIG. 1. The communication module 200 may include, but is not limited to, transmitter circuitry 205, receiver circuitry 210, communications circuitry 215, and/or one or more antennas 220 coupled with each at least as shown.

Briefly, the communications circuitry 215 may be coupled with the antennas 220 to facilitate over-the-air communication of signals to/from the communication module 200. Operations of the communications circuitry 215 may include, but are not limited to, filtering, amplifying, storing, modulating, demodulating, transforming, etc.

The transmitter circuitry 205 may be coupled with the communications circuitry 215 and may be configured to provide signals to the communications circuitry 215 for transmission by the antennas 220. In various embodiments, the transmitter circuitry 205 may be configured to provide various signal processing operations on the signal to provide the signal to the communications circuitry with appropriate characteristics. In some embodiments, the transmitter circuitry 205 may be configured to wirelessly transmit one or more data packets and/or analog voice data associated with a virtual machine. Such activity of the transmitter circuitry 205 may prevent the virtual machine from being determined to be idle.

The transmitter circuitry 205 may be configured to receive signals for transmission by the communications circuitry 215 (e.g., signals from a virtual machine (not shown) communicatively coupled with the communication module 200). In some embodiments, the transmitter circuitry 205 may be adapted to generate signals. Further, the transmitter circuitry 205 may be adapted to scramble, multiplex, and/or modulate various signals prior to transmission by the communications circuitry 215.

The receiver circuitry 210 may be coupled with the communications circuitry 215 and may be configured to receive signals for and/or from the communications circuitry 215, such as signals detected by one or more antennas 220. In some embodiments, the receiver circuitry 210 may be adapted to generate, adapt, or otherwise change signals. Further, the receiver circuitry 210 may be adapted to send received signals to another module or component (not shown), such as a virtual machine, communicatively coupled with the communication module 200 so that data received from outside a device having the communication module 200 may utilize that data at the device. In some embodiments, the receiver circuitry 210 may receive one or more data packets and/or analog voice data associated with a virtual machine. Such activity of the receiver circuitry 210 may prevent the virtual machine from being determined to be idle. As a result, the virtual machine would continue to consume power, which may not be desirable, e.g., for a portable computing device.

Some or all of the communications circuitry 215, transmitter circuitry 205, and/or the receiver circuitry 210 may be included in, for example, a communication chip and/or communicatively coupled with a printed circuit board.

Figure 3:
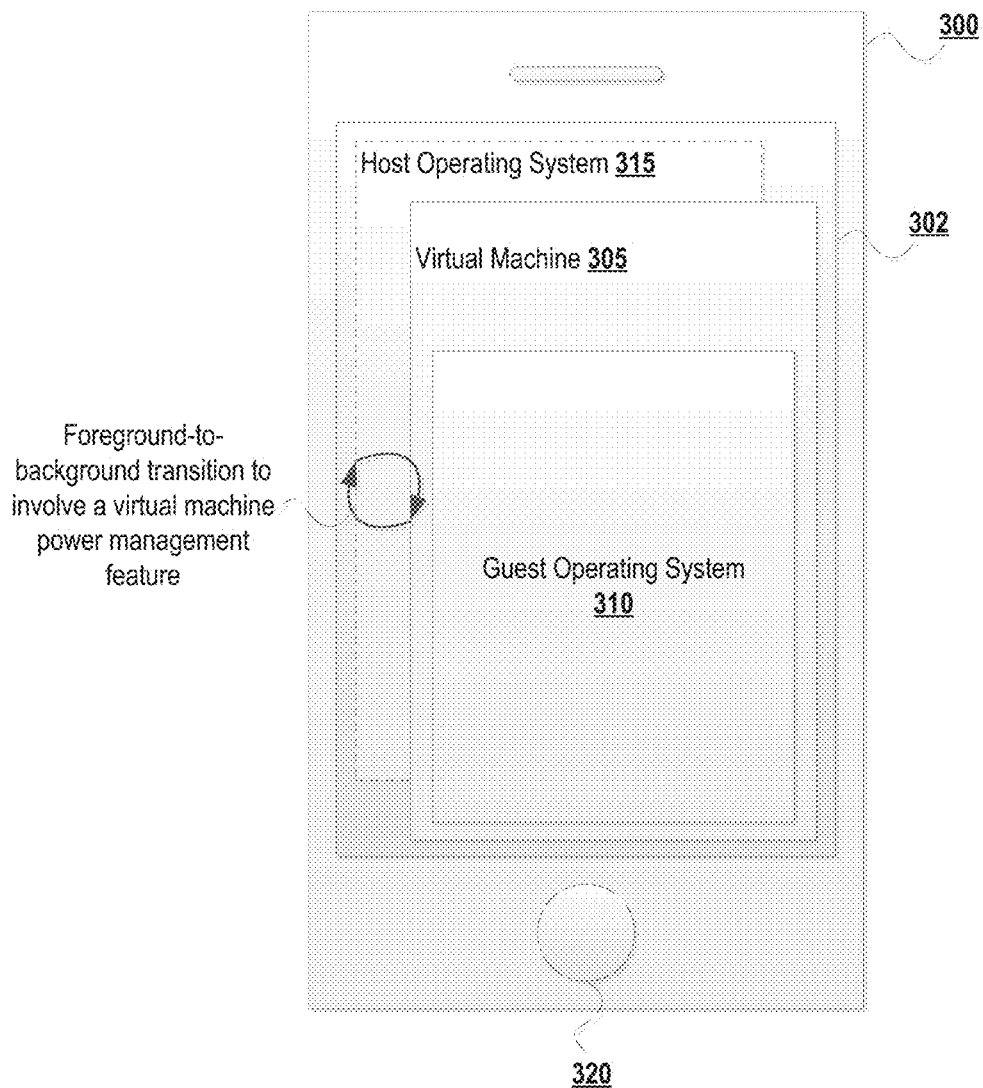
FIG. 3 is a block diagram illustrating a portable electronic device that includes a virtual machine power management feature to manage power consumption by a virtual machine on the portable electronic device, in accordance with various embodiments.

FIG. 3 shows a block diagram of a portable electronic device 300 that includes a virtual machine power management feature to manage power consumption by a virtual machine, in accordance with various embodiments. The portable electronic device 300 may be or may be included in the computing device 100 of FIG. 1. Accordingly, the virtual machine 305 may be the virtual machine 115, the guest operating system 310 may be the guest operating system 116, and/or the host operating system 315 may be the host operating system 114.

The portable electronic device 300 may feature one or more characteristics that may constrain the contemporaneous presentation of multiple elements at the display 302. For example, a size of the display 302 may be of an appreciably limited size, a processor (not shown) may be of an appreciably limited power, a memory (not shown) may be of an appreciably limited size, and/or a power source may be of an appreciably limited capacity so that performance of the portable electronic device 300 may be improved if only one element is in a foreground state. In embodiments, one of the virtual machine 305 or the host operating system 114 may be in a foreground state at the portable electronic device 300. In embodiments, a foreground state may indicate that instructions issued by that foreground operating system (i.e., the host operating system 315 or the guest operating system 310) are associated with a high priority in a scheduler (not shown)—for example, a topmost window on the display 302, a component having focus (e.g., a window of an operating system selected to receive input through a gesture-recognition display 302). Remaining elements (e.g., the other of the operating systems 310, 315 not in the foreground state) would be in the background state.

In the illustrated embodiment, the virtual machine 305 may be in the foreground state, which may cause the guest operating system 310 to be presented and/or have focus on the display 302. Thus, the host operating system 315 may be in the background state. In various embodiments, an event or the absence thereof may cause the virtual machine 305 to transition from the foreground state to the background state—e.g., the detection of a user input (e.g., selection of tactile button 320) that is to cause the host operating system 315 to transition to the foreground state and/or the absence of activity, such as network communication, for the virtual machine 305. In such embodiments, the guest operating system 310 may no longer have focus at the display 302. Responsively, a virtual machine power management feature of the portable electronic device 300 may cause a reduction in processor cycles consumed by virtual machine 305 (e.g., processor cycles to be consumed based on instructions issued by the guest operating system 310 may be suspended or terminated and/or frequency of interrupts associated with the virtual machine 305 may be decreased or entirely eliminated). Correspondingly, the virtual machine power management feature of the portable electronic device 300 may cause an increase in processor cycles consumed by virtual machine 305 (e.g., processor cycles to be consumed based on instructions issued by the guest operating system 310) when the virtual machine 305 is to transition from the background state to the foreground state.

Figure 4:
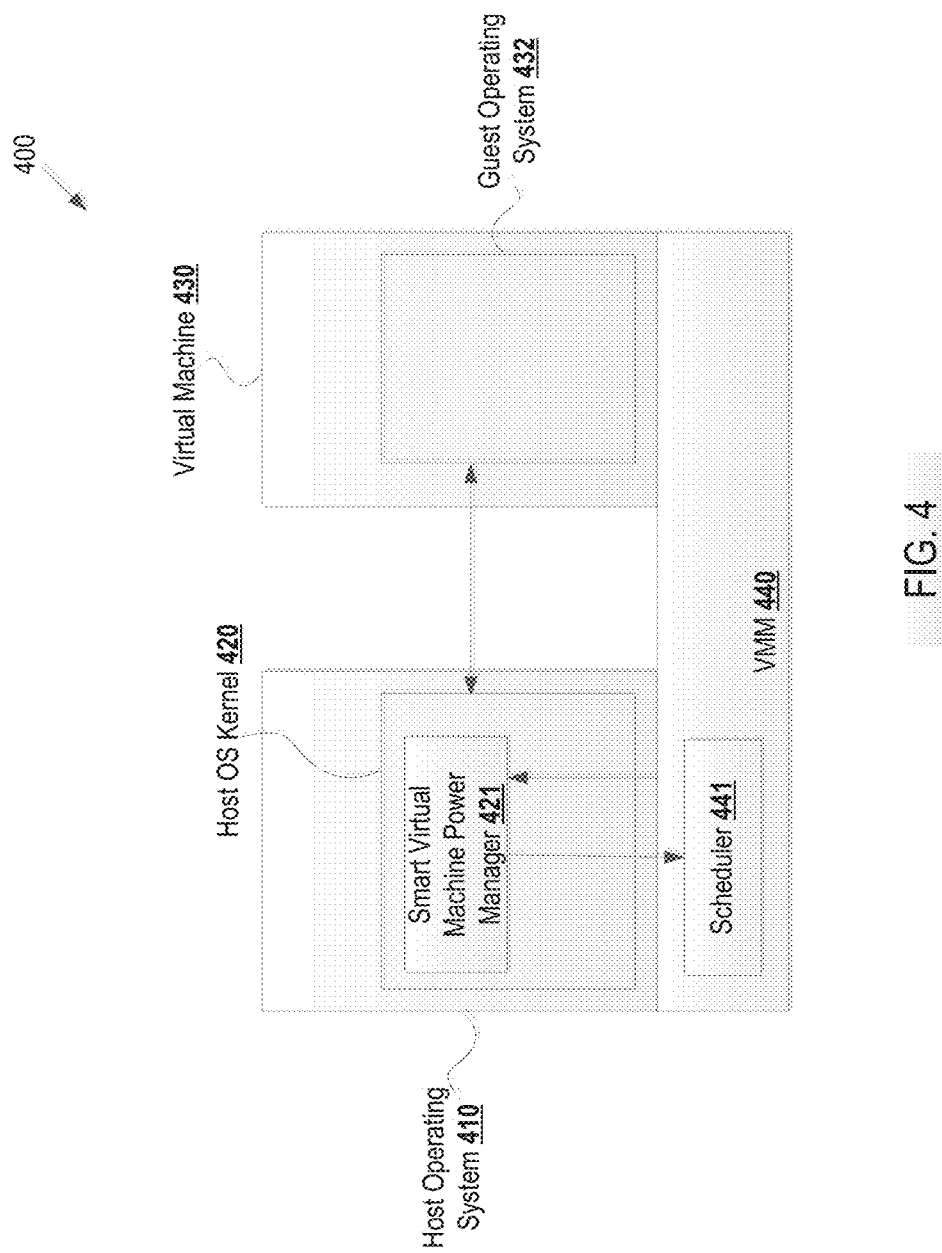
FIG. 4 is a block diagram illustrating a system that includes a smart virtual machine power manager, in accordance with various embodiments.

With respect to FIG. 4, a block diagram shows system 400 that includes a smart virtual machine power manager 421, in accordance with various embodiments. The system 400 may be included in the computing device 100 of FIG. 1. Accordingly, the virtual machine 430 may be the virtual machine 115, the guest operating system 432 may be the guest operating system 116, the host operating system 410 may be the host operating system 114, the smart virtual machine power manager 421 may be the smart virtual machine power manager 111, and/or the VMM 440 may be the VMM 112. According to various embodiments, the system 400 may be full virtualization, paravirtualization, or hardware-assisted virtualization with the virtual machine 430.

In embodiments, the host operating system 410 of the system 400 may include and/or may be communicatively coupled with a host operating system kernel ("kernel") 420. The kernel 420 may be adapted to manage one or more requests received from components of the system 400, such as by translating a request into one or more instructions for hardware (not shown) of the system 400 (e.g., a processor, a memory, and the like).

Further, the system 400 may include a scheduler 441, which may be included in or communicatively coupled to the VMM 440 (although in other embodiments, the scheduler 441 may be included in the host operating system 410). As one or more instructions to execute one or more threads or processes are received, the scheduler 441 may add the one or more threads or processes to a queue. The scheduler 441 may select a thread or process that is to consume one or more processor cycles, such as a thread or process associated with the guest operating system 432. The scheduler 441 may operate according to a predetermined scheduling algorithm that accounts for, for example, latency, fairness (e.g., thread or process priority), throughput, and/or wait time.

According to embodiments, the guest operating system 432 may issue one or more instructions for one or more threads or processes that require hardware of the system 400. The one or more instructions may be received at the kernel 420 and scheduled by the scheduler 441 so that hardware access may be consistently managed. The smart virtual machine power manager 421, which may be included in or may be communicatively coupled with the kernel 420, may receive an indication of these one or more instructions. Additionally, the smart virtual machine power manager 421 may receive an indication of one or more events associated with the guest operating system 432 from the VMM 440, such as a detection of a transition of the virtual machine 430 from a foreground state to a background state, a detection of a user input for the guest operating system 432, detection of a communication event (e.g., reception of a data packet and/or communication of analog voice data) associated with the guest operating system 432, and/or detection of a power state of the guest operating system 432.

In various embodiments, the smart virtual machine power manager 421 may receive an indication of an event or determine that the virtual machine 430 is in an idle state based on the absence of an event that causes the smart virtual machine power manager 421 to determine that the virtual machine 430 should be frozen. Therefore, the smart virtual machine power manager 421 may signal the scheduler 441 to remove one or more threads or processes associated with the virtual machine 430 from the queue. Because the one or more threads or processes associated with the virtual machine 430 may no longer be selected by the scheduler 441, the amount of processor cycles to be consumed by the virtual machine 430 may be reduced and may in fact be eliminated entirely. In some embodiments, the smart virtual machine power manager 421 may prevent one or more instructions associated with the guest operating system 432 from causing the scheduler 441 to add one or more threads or processes to the queue.

Correspondingly, the smart virtual machine power manager 421 may receive an indication of an event or determine that the virtual machine 430 is no longer in an idle state based on the detection of an event that causes the smart virtual machine power manager 421 to determine that the virtual machine 430 should be unfrozen. Therefore, the smart virtual machine power manager 421 may signal the scheduler 441 to begin or resume adding one or more threads or processes associated with the virtual machine 430 to the queue. Because the one or more threads or processes associated with the virtual machine 430 may be selected by the scheduler 441, the amount of processor cycles to be consumed by the virtual machine 430 may be increased. In some embodiments, the smart virtual machine power manager 421 may allow one or more instructions associated with the guest operating system 432 to cause the scheduler 441 to add one or more threads or processes to the queue.

According to embodiments, the freezing of the virtual machine 430 by the smart virtual machine power manager 421 may affect one or more timers associated with the guest operating system 432. In connection with the reduction in the processor cycles consumed by the virtual machine 430, the smart virtual machine power manager 421 may cause the guest operating system 432 to cease or pause running or incrementing one or more timers, such as a programmable interval timer, a time stamp counter, and/or a high precision event timer, a real-time clock, and/or another wall clock. When the smart virtual machine power manager 421 unfreezes—i.e., causes an increase in processor cycles consumed by the virtual machine 430—the smart virtual machine power manager 421 may cause the guest operating system 432 to adjust and/or resume the one or more timers—e.g., the real-time clock may be adjusted to be consistent with a real-time clock associated with the host operating system 410.

Figure 5:
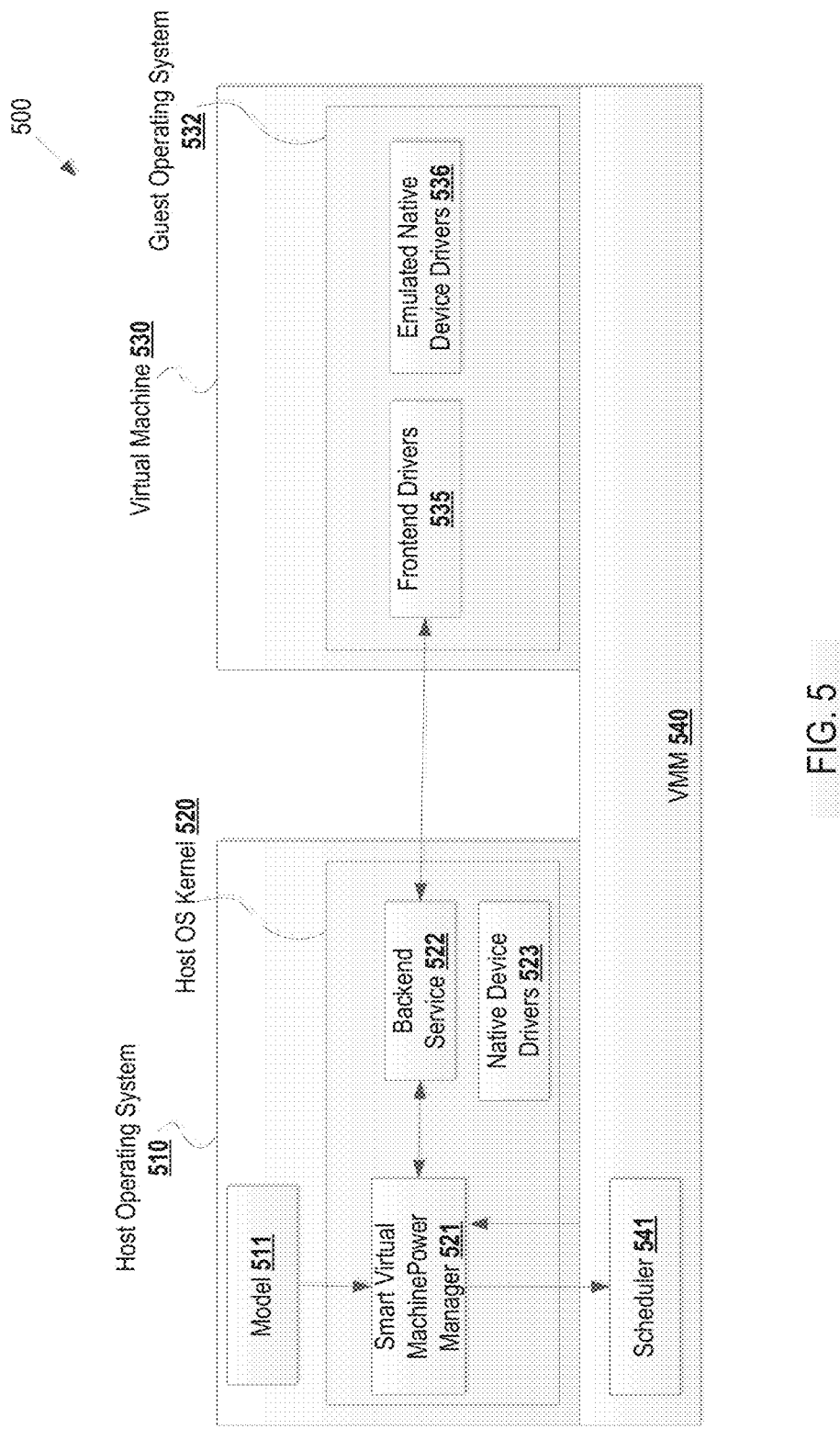
FIG. 5 is a block diagram illustrating another embodiment of a system that includes a smart virtual machine power manager, in accordance with various embodiments.

With respect to FIG. 5, a block diagram shows system 500 that includes a smart virtual machine power manager 521, in accordance with various embodiments. The system 500 may include another embodiment of the system 400 of FIG. 4. Accordingly, the virtual machine 530 may be the virtual machine 430, the guest operating system 532 may be the guest operating system 432, the host operating system 510 may be the host operating system 410, the smart virtual machine power manager 521 may be the smart virtual machine power manager 421, and/or the VMM 540 may be the VMM 440.

In various embodiments, the guest operating system 532 may include emulated native device drivers 536, which may receive, for example, read and/or write instructions from the guest operating system 532. Further, the guest operating system 532 may include one or more frontend drivers 535 to provide the guest operating system 532 with access to one or more generic virtual devices. In embodiments, instructions from the guest operating system 532 may be issued to the one or more frontend drivers 535, which are managed by a backend service 522 and/or a device model 511 that may allow binary translation and/or native execution of instructions from the guest operating system 532. Thus even though virtualized (or paravirtualized), the guest operating system 532 may be adapted to receive and/or respond to one or more events, such as a communication event and/or detection of user input. Through the backend service 522, one or more instructions issued by the guest operating system 532 through the frontend drivers 535 may be added to the queue of the scheduler 541. Therefore, one or more processor cycles may cause the instructions to be executed to the native device drivers 523 (e.g., the physical hardware of the system 500).

The smart virtual machine power manager 521 may receive an indication of one or more instructions to be managed by the backend service 522, such as reception of or response to an event. In various embodiments, the smart virtual machine power manager 521 may receive an indication of an event or determine that the virtual machine 530 is in an idle state based on the absence of an event based on signals indicated by the backend service 522. In response, the smart virtual machine power manager 521 may determine that the virtual machine 530 should be frozen. Therefore, the smart virtual machine power manager 521 may signal the scheduler 541 to remove one or more threads or processes associated with the virtual machine 530 from the queue. Because the one or more threads or processes associated with the virtual machine 530 may no longer be selected by the scheduler 541, the amount of processor cycles to be consumed by the virtual machine 530 may be reduced and may in fact be eliminated entirely. In some embodiments, the smart virtual machine power manager 521 may prevent one or more instructions associated with the guest operating system 532 from causing the scheduler 541 to add one or more threads or processes to the queue.

Correspondingly, the smart virtual machine power manager 521 may receive an indication of an event or determine that the virtual machine 530 is no longer in an idle state based on signals indicated by the backend service 522. In response, the smart virtual machine power manager 521 may determine that the virtual machine 530 should be unfrozen. Therefore, the smart virtual machine power manager 521 may signal the scheduler 541 to begin or resume adding one or more threads or processes associated with the virtual machine 530 to the queue. Because the one or more threads or processes associated with the virtual machine 530 may be selected by the scheduler 541, the amount of processor cycles to be consumed by the virtual machine 530 may be increased. In some embodiments, the smart virtual machine power manager 521 may allow one or more instructions associated with the guest operating system 532 to cause the scheduler 541 to add one or more threads or processes to the queue.

Figure 6:
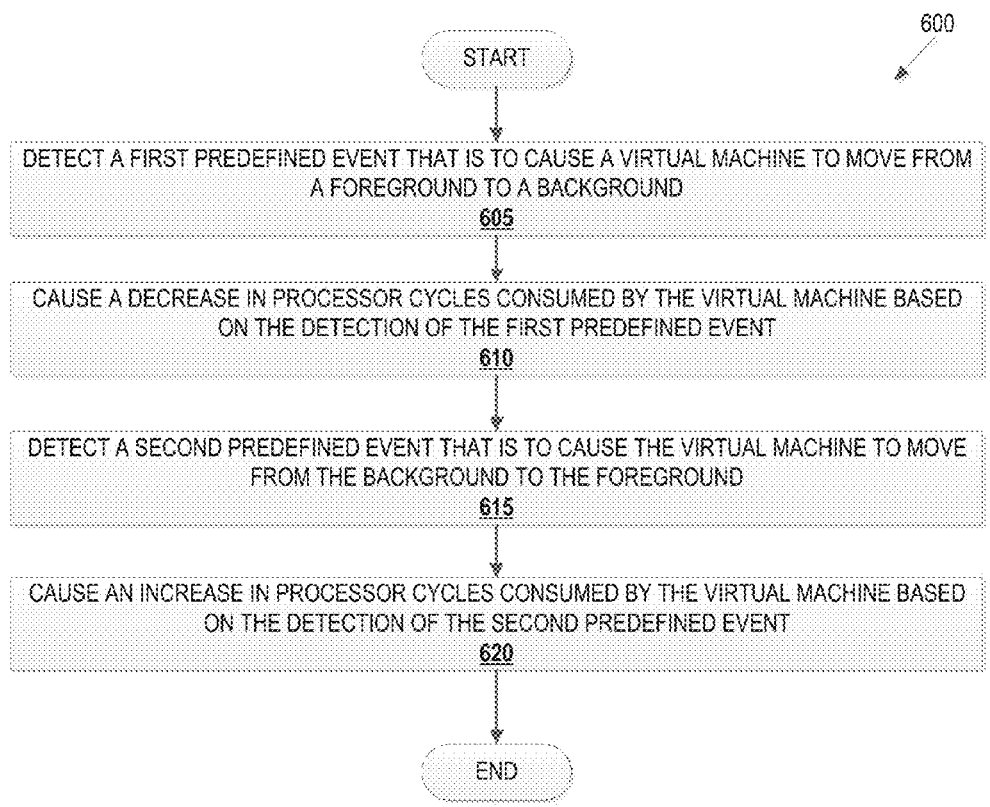
FIG. 6 is a flow diagram illustrating a method for managing the power consumption of a virtual machine on a computing device, in accordance with various embodiments.

With respect to FIG. 6, a flow diagram illustrates a method 600 for managing the power consumption of a virtual machine, in accordance with various embodiments. The method 600 may be performed by a computing device, such as the computing device 100 of FIG. 1. While FIG. 6 illustrates a plurality of sequential operations, one of ordinary skill would understand that one or more operations of the method 600 may be transposed and/or performed contemporaneously.

To begin, the method 600 may include operation 605 for detecting a first predefined event that is to cause a virtual machine to move from a foreground to a background. In one embodiment, this first predefined event may be, for example, detection of a user interaction, such as depression of a tactile button and/or recognition of a gesture. Based on the detection of the first predefined event, the method 600 may include an operation 610 for causing a decrease in processor cycles consumed by the virtual machine. Accordingly, processor cycles consumed by the virtual machine may be decreased when the virtual machine is no longer in the foreground. In an embodiment, operation 610 may comprise reducing a frequency of interrupts associated with the virtual machine, which may facilitate entry of the processor into a low power state (e.g., from C1 to C7).

In embodiments, the method 600 may include an operation 615 for detecting a second predefined event that is to cause the virtual machine to move from the background to the foreground. In one embodiment, this second predefined event may be, for example, detection of a user interaction, such as depression of a tactile button and/or recognition of a gesture. Based on the detection of the second predefined event, the method 600 may include an operation 620 for causing an increase in processor cycles consumed by the virtual machine. Accordingly, processor cycles consumed by the virtual machine may be increased when the virtual machine is no longer in the background.

Figure 7:
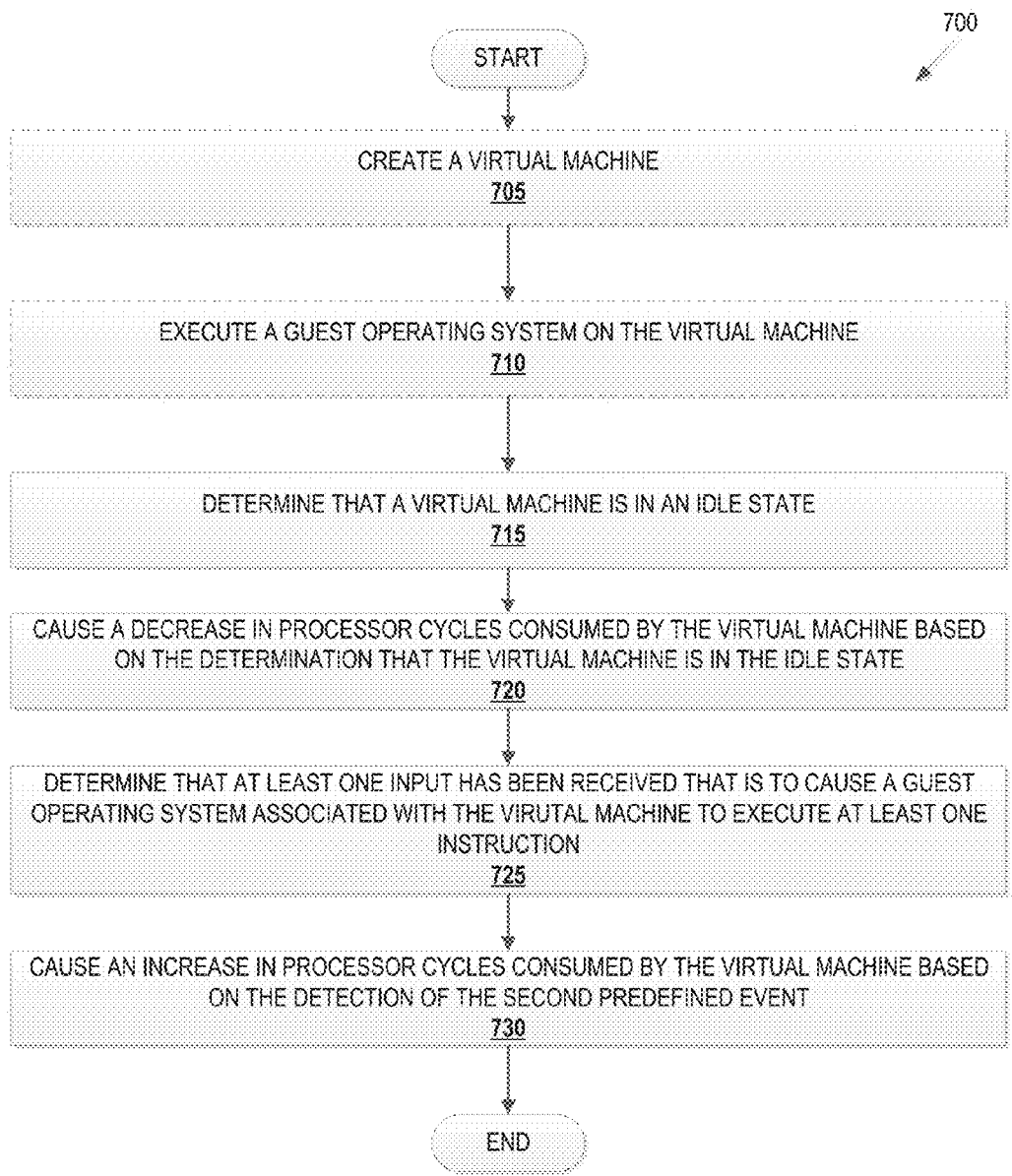
FIG. 7 is a flow diagram illustrating another embodiment of a method for managing the power consumption of a virtual machine on a computing device, in accordance with various embodiments.

Turning to FIG. 7, a flow diagram illustrates a method 700 for managing the power consumption of a virtual machine, in accordance with various embodiments. The method 700 may be performed by a computing device, such as the computing device 100 of FIG. 1. While FIG. 7 illustrates a plurality of sequential operations, one of ordinary skill would understand that one or more operations of the method 700 may be transposed and/or performed contemporaneously.

In embodiments, the method 700 may include an operation 705 creating a virtual machine. Further thereto, the method 700 may include an operation 710 for executing a guest operating system on the virtual machine. Operation 715 may include determining that the virtual machine is in an idle state. According to various embodiments, operation 715 may include operations associated with determining an absence, for a predetermined period of time, of user interaction, network activity, or processor activity (e.g., a residency ratio associated with the guest operating system of at least ninety-five (95) percent for C1, or more inactive, power state). In another embodiment, operation 715 may include operations associated with receiving, from the guest operating system, one or more requests for a more inactive power state (e.g., the guest operating system may request a C1 state). In one embodiment, operation 715 may include operations associated with determining that the virtual machine is no longer in the foreground state and, therefore, is in an idle state. Based on the determination that the virtual machine is in the idle state, the method 700 may include an operation 720 for causing a decrease in processor cycles consumed by the virtual machine. This operation 720 may include operations associated with suspending or terminating one or more threads scheduled for execution and/or decreasing (e.g., eliminating) interrupt frequency associated with the virtual machine. Accordingly, processor cycles consumed by the virtual machine may be decreased when the virtual machine is in an idle state. In an embodiment, operation 720 may comprise reducing a frequency of interrupts associated with the virtual machine, which may facilitate entry of the processor into a low power state (e.g., from C1 to C7).

In embodiments, the method 700 may include an operation 725 for determining at least one input has been received that is to cause the guest operating system, executed on the virtual machine, to execute at least one instruction. In one embodiment, this at least one input may be, for example, a user interaction (e.g., depression of a tactile button and/or recognition of a gesture), a network event (e.g., reception of a network data packet and/or reception of analog voice data), and/or a request for a more active power state (e.g., a request for a C0 power state). Based on the determining that the at least one input has been received, the method 700 may include an operation 730 for causing an increase in processor cycles consumed by the virtual machine. Accordingly, processor cycles consumed by the virtual machine may be increased when the virtual machine is no longer in the idle state, such as by restarting or resuming one or more threads associated with the virtual machine and/or increasing (e.g., restarting or resuming) interrupts associated with the virtual machine.

In various embodiments, example 1 may be a computing device that includes a virtual machine power management feature, the computing device comprising: a virtual machine monitor to manage execution, on the computing device, a virtual machine, and to transition the virtual machine from a foreground state to a background state; and a smart virtual machine power manager, coupled with the virtual machine monitor, to detect that the virtual machine is no longer in the foreground state and to cause a reduction in processor cycles consumed by the virtual machine in response to the detection that the virtual machine is no longer in the foreground state. Example 2 may include the computing device of example 1, wherein the computing device is a portable electronic device. Example 3 may include the computing device of example 1, wherein the smart virtual machine power manager is to cause the reduction in processor cycles consumed by the virtual machine through causation of a reduction in processor cycles consumption by a guest operating system of the virtual machine or through reduction of a frequency of interrupts associated with the virtual machine. Example 4 may include the computing device of example 3, wherein the smart virtual machine power manager is to cause the reduction in processor cycles consumption by the guest operating system of the virtual machine through prevention of the guest operating system from execution of any instructions. Example 5 may include the computing device of any of examples 1-4, wherein the smart virtual machine power manager is to detect that the virtual machine is no longer in the background state and to cause an increase in processor cycles consumed by the virtual machine in response to the detection that the virtual machine is no longer in the background state. Example 6 may include the computing device of example 5, wherein the smart virtual machine power manager is to cause the reduction in processor cycles consumed by the virtual machine by suspension or end of one or more processes to be executed by the guest operating system of the virtual machine, and further wherein the smart virtual machine power manager is to cause the increase in processor cycles consumed by the virtual machine by resumption or restart of the one or more processes that were to be executed by the guest operating system of the virtual machine before the reduction. Example 7 may include the computing device of any of examples 1-4, wherein the virtual machine monitor is a hypervisor and the smart virtual machine power manager is to use a hypercall to the hypervisor to cause the reduction in processor cycles consumed by the virtual machine. Example 8 may include the computing device of any of examples 1-4, wherein the smart virtual machine power manager is to detect that the virtual machine is no longer in the foreground state based on detection of a user input. Example 9 may include the computing device of example 8, wherein the virtual machine monitor is to detect the user input through a user interface and is to transition the virtual machine from the foreground state to the background state in response to the user input, and the computing device further comprises: the user interface, coupled with the virtual machine monitor, to detect the user input to the computing device. Example 10 may include the computing device of example 9, wherein the user interface is a touch screen, a tactile button, or a gesture-recognition device.

In various embodiments, example 11 may be a computing device that includes a virtual machine power management feature, the computing device comprising: a virtual machine monitor to manage execution, on the computing device, a virtual machine having a guest operating system and to detect at least one event that is to cause the guest operating system to execute one or more instructions; and a smart virtual machine power manager, coupled with the virtual machine monitor, to determine that the virtual machine is in an idle state, to cause a decrease in processor cycles consumed by the virtual machine based on the determination that the virtual machine is in the idle state, and to cause an increase in processor cycles consumed by the virtual machine in response to the detection of the at least one event. Example 12 may include the computing device of example 11, wherein the computing device is a portable electronic device. Example 13 may include the computing device of example 11, wherein the smart virtual machine power manager is to cause the decrease in the processor cycles consumed by the virtual machine based on a request to a scheduler of the computing device, the request to remove at least one process associated with the virtual machine from a queue associated with the scheduler. Example 14 may include the computing device of example 11, wherein the smart virtual machine power manager is to determine that the virtual machine is in the idle state while the virtual machine is in a foreground state at the computing device. Example 15 may include the computing device of any of examples 11-14, wherein the smart virtual machine power manager is to determine that the virtual machine is in the idle state based on an instruction to transition the virtual machine to a background state. Example 16 may include the computing device of any of examples 11-14, wherein the smart virtual machine power manager is to determine that the virtual machine is in the idle state based on absence of a network packet for a predetermined interval and the at least one event includes reception of a packet over a network, and the computing device further comprises: a receiver, coupled with the virtual machine monitor, to process the packet to be received over the network. Example 17 may include the computing device of example 16, wherein the smart virtual machine power manager is to determine that the virtual machine is in the idle state based on absence of a voice call for another predetermined interval and the at least one event includes reception of the voice call, and further wherein the receiver is to process the received voice call. Example 18 may include the computing device of any of examples 11-14, wherein the smart virtual machine power manager is to determine that the virtual machine is in the idle state based on absence of user interaction and the at least one event includes reception of the user interaction, and the computing device further comprises: a user interface, coupled with the virtual machine monitor, to detect the reception of the user interaction. Example 19 may include the computing device of any of examples 11-14, wherein the smart virtual machine power manager is to determine that the virtual machine is in the idle state based on a virtual C state that is to be indicated by the guest operating system.

In various embodiments, example 20 may be one or more non-transitory computer system-readable media comprising computing device-executable instructions, wherein the instructions, in response to execution by a computing device, cause the computing device to: detect a first predefined event that is to cause a virtual machine that operates on the computing device to move from a foreground of the computing device to a background of the computing device; cause a decrease in processor cycles consumed by the virtual machine based on the detection of the first predefined event; detect a second predefined event that is to cause the virtual machine to move from the background to the foreground; and cause an increase in processor cycles consumed by the virtual machine based on the detection of the second predefined event. Example 21 may include the one or more non-transitory computer system-readable media of example 20, wherein the computing device is a smartphone, a tablet computer, a portable media player, or a laptop computer. Example 22 may include the one or more non-transitory computer system-readable media of any of examples 20-21, wherein the first defined event is reception of a first user interaction with a user interface of a portable electronic device, and the second predefined event is reception of a second user interaction with the user interface.

In various embodiments, example 23 may be one or more non-transitory computer system-readable media comprising computing device-executable instructions, wherein the instructions, in response to execution by a portable electronic device, cause the portable electronic device to: determine that a virtual machine, executed at the portable electronic device, is in an idle state; cause a decrease in processor cycles consumed by the virtual machine based on the determination that the virtual machine is in the idle state; determine that the portable electronic device has received at least one input that is to cause a guest operating system associated with the virtual machine to execute at least one instruction; and cause an increase in processor cycles consumed by the virtual machine in response to the determination that the at least one input has been received. Example 24 may include the one or more non-transitory computer system-readable media of example 23, wherein the instructions, in response to execution by the computing device, further cause the computing device to: create the virtual machine; and execute a guest operating system on the created virtual machine. Example 25 may include the one or more non-transitory computer system-readable media of any of examples 23-24, wherein the determination that the virtual machine is in the idle state includes a determination of an absence, for a predetermined period of time, of user interaction, network activity, or processor activity.

In various embodiments, example 26 may be computer-implemented method for implementing a virtual machine power management feature, the method comprising: detecting, by a computing device, a first predefined event that is to cause a virtual machine that operates on the computing device to move from a foreground of the computing device to a background of the computing device; causing, by the computing device, a decrease in processor cycles consumed by the virtual machine based on the detection of the first predefined event; detecting, by the computing device, a second predefined event that is to cause the virtual machine to move from the background to the foreground; and causing, by the computing device, an increase in processor cycles consumed by the virtual machine based on the detection of the second predefined event. Example 27 may include the computer-implemented method of example 26, wherein the computing device is a smartphone, a tablet computer, a portable media player, and a laptop computer. Example 28 may include the computer-implemented method of example 26, wherein the first defined event is reception of a first user interaction with a user interface of the computing device, and the second predefined event is reception of a second user interaction with the user interface. Example 29 may include the computer-implemented method of any of examples 26-28, wherein the causing the decrease in processor cycles comprises: suspending, by the computing device, one or more processes to be executed by a guest operating system of the virtual machine. Example 30 may include the computer-implemented method of any of examples 26-28, and wherein the causing the increase in processor cycles comprises: resuming, by the computing device, one or more processes that were to be executed by a guest operating system of the virtual machine before the causing of the decrease in processor cycles. Example 31 may include the computer-implemented method of any of examples 26-28, wherein the causing the decrease in processor cycles comprises: using, by the computing device, a hypercall to a hypervisor associated with the computing device to cause the reduction in processor cycles consumed by the virtual machine.

In various embodiments, example 32 may be a computer-implemented method for implementing a virtual machine power management feature, the method comprising: determining, by a portable electronic device, that a virtual machine is in an idle state; causing, by the portable electronic device, a decrease in processor cycles consumed by the virtual machine based on the determination that the virtual machine is in the idle state; receiving, by the portable electronic device, at least one input that is to cause a guest operating system associated with the virtual machine to execute at least one instruction; and causing, by the portable electronic device, an increase in processor cycles consumed by the virtual machine in response to the determination that the at least one input has been received. Example 33 may include the computer-implemented method of example 32, the method further comprising: creating, by the portable electronic device, the virtual machine; and executing, by the portable electronic device, a guest operating system on the created virtual machine. Example 34 may include the computer-implemented method of any of examples 32-33, wherein the determining that the virtual machine is in the idle state comprises: determining, by the portable electronic device, an absence, for a predetermined period of time, of user interaction, network activity, or processor activity. Example 35 may include the computer-implemented method of any of examples 32-33, wherein the determining that the virtual machine is in the idle state comprises: determining, by the portable electronic device, that the virtual machine is no longer in a foreground. Example 36 may include the computer-implemented method of any of examples 32-33, wherein the causing the decrease in processor cycles comprises: using, by the portable electronic device, a hypercall to a hypervisor associated with the portable electronic device to cause the reduction in processor cycles consumed by the virtual machine. Example 37 may include the computer-implemented method of any of examples 32-33, wherein the causing the decrease in processor cycles comprises: using, by the portable electronic device, a request to a scheduler associated with the portable electronic device, the request to remove at least one process associated with the virtual machine from a queue associated with the scheduler. Example 38 may include the computer-implemented method of any of examples 32-33, wherein the portable electronic device is a smartphone, a tablet computer, a portable media player, or a laptop computer.

In various embodiments, example 39 may be an apparatus, the apparatus comprising: means for detecting a first predefined event that is to cause a virtual machine that operates on a computing device to move from a foreground of the computing device to a background of the computing device; means for causing a decrease in processor cycles of the computing device consumed by the virtual machine based on the detection of the first predefined event; means for detecting a second predefined event that is to cause the virtual machine to move from the background to the foreground; and means for causing an increase in processor cycles of the computing device consumed by the virtual machine based on the detection of the second predefined event.

In various embodiments, example 40 may be an apparatus, the apparatus comprising: means for determining that a virtual machine associated with a portable electronic device is in an idle state; means for causing a decrease in processor cycles of the portable electronic device consumed by the virtual machine based on the determination that the virtual machine is in the idle state; means for receiving at least one input that is to cause a guest operating system associated with the virtual machine to execute at least one instruction; and means for causing an increase in processor cycles of the portable electronic device consumed by the virtual machine in response to the determination that the at least one input has been received.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computing device that includes a virtual machine power management feature, the computing device comprising:
   a virtual machine monitor to manage execution, on the computing device, of a virtual machine, including a scheduler to schedule one or more threads or processes associated with the virtual machine onto a queue, -wherein the virtual machine monitor is to further transition the virtual machine from a foreground state to a background state; and
   a smart virtual machine power manager, coupled with the virtual machine monitor, to detect that the virtual machine is no longer in the foreground state and to cause the scheduler to remove the one or more threads or processes associated with the virtual machine from the queue, in response to the detection that the virtual machine is no longer in the foreground state, wherein on causing the scheduler to remove the one or more threads or processes associated with the virtual machine from the queue, the smart virtual machine power manager causes a reduction in processor cycles consumed by the virtual machine.

2. The computing device of claim 1, wherein the computing device is a portable electronic device.

3. The computing device of claim 1, wherein on causing the scheduler to remove the one or more threads or processes associated with the virtual machine from the queue, the smart virtual machine power manager causes a reduction of a frequency of interrupts associated with the virtual machine.

4. The computing device of claim 1, wherein on causing the scheduler to remove the one or more threads or processes associated with the virtual machine from the queue, the smart virtual machine power manager prevents a guest operating system from execution of any instructions.

5. The computing device of claim 1, wherein the smart virtual machine power manager is to detect that the virtual machine is no longer in the background state and to cause an increase in processor cycles consumed by the virtual machine in response to the detection that the virtual machine is no longer in the background state.

6. The computing device of claim 5, wherein the smart virtual machine power manager is to cause the reduction in processor cycles consumed by the virtual machine by suspension or end of one or more processes to be executed by a guest operating system of the virtual machine, and further wherein the smart virtual machine power manager is to cause the increase in processor cycles consumed by the virtual machine by resumption or restart of the one or more processes that were to be executed by the guest operating system of the virtual machine before the reduction.

7. The computing device of claim 1, wherein the virtual machine monitor is a hypervisor and the smart virtual machine power manager is to use a hypercall to the hypervisor to cause the reduction in processor cycles consumed by the virtual machine.

8. The computing device of claim 1, wherein the smart virtual machine power manager is to detect that the virtual machine is no longer in the foreground state based on detection of a user input.

9. The computing device of claim 8, wherein the virtual machine monitor is to detect the user input through a user interface and is to transition the virtual machine from the foreground state to the background state in response to the user input, and the computing device further comprises:
   the user interface, coupled with the virtual machine monitor, to detect the user input to the computing device.

10. The computing device of claim 9, wherein the user interface is a touch screen, a tactile button, or a gesture-recognition device.

11. One or more non-transitory computer system-readable media comprising computing device-executable instructions, wherein the instructions, in response to execution by a computing device, cause the computing device to:
    detect a first predefined event that is to cause a virtual machine that operates on the computing device to move from a foreground of the computing device to a background of the computing device;
    cause a decrease in processor cycles consumed by the virtual machine based on the detection of the first predefined event, by removing one or more threads or processes associated with the virtual machine from a scheduling queue;
    detect a second predefined event that is to cause the virtual machine to move from the background to the foreground; and
    cause an increase in processor cycles consumed by the virtual machine based on the detection of the second predefined event, by causing the one or more threads or processes associated with the virtual machine to be placed back into the scheduling queue.

12. The one or more non-transitory computer system-readable media of claim 11, wherein the computing device is a smartphone, a tablet computer, a portable media player, or a laptop computer.

13. The one or more non-transitory computer system-readable media of claim 11, wherein the first predefined event is reception of a first user interaction with a user interface of a portable electronic device, and the second predefined event is reception of a second user interaction with the user interface.

* * * * *